United States Patent
Chou

(10) Patent No.: US 6,484,513 B1
(45) Date of Patent: Nov. 26, 2002

(54) FREEZING SUCKER

(76) Inventor: Chin-Lung Chou, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/950,354

(22) Filed: Sep. 5, 2001

(51) Int. Cl.[7] .................................................. F25B 21/02
(52) U.S. Cl. ........................................ 62/3.2; 62/3.62
(58) Field of Search ...................... 62/3.2, 3.62, 3.63, 62/3.64

(56) References Cited

U.S. PATENT DOCUMENTS 5,197,294 A * 3/1993 Galvan et al. ............. 607/108
5,560,211 A * 10/1996 Parker ........................ 62/137
5,817,188 A * 10/1998 Yahatz et al. .............. 136/201
6,237,149 B1 * 5/2001 MacDonald .................. 2/22
6,343,478 B1 * 2/2002 Chang ...................... 62/259.2
6,345,086 B1 * 3/2002 Inoue et al. .................. 62/3.2

* cited by examiner

*Primary Examiner*—William E. Tapolcai

(57) ABSTRACT

A freezing sucker has a base plate, a main panel disposed on the base plate, a plurality of chilling chips disposed on the main panel, a top plate disposed on the chilling chips, and a plurality of temperature sensors disposed between the main panel and the top plate. A freezing machine has a controller and a control panel. A connector is connected to the main panel. A water pipe is connected to the connector and the freezing machine.

6 Claims, 5 Drawing Sheets

FREEZING SUCKER

BACKGROUND OF THE INVENTION

The present invention relates to a freezing sucker. More particularly, the present invention relates to a freezing sucker which will be frozen and defrosted quickly.

A nonmagnetic article cannot be attracted by magnets. A mechanical holder may hurt the nonmagnetic article while the mechanical holder holds the nonmagnetic article tightly.

SUMMARY OF THE INVENTION

An object of the present invention is to provide a freezing sucker which freezes a bottom of a working article in order to hold the working article without magnets.

Accordingly, a freezing sucker comprises a base plate, a main panel disposed on the base plate, a plurality of chilling chips disposed on the main panel, a top plate disposed on the chilling chips, and a plurality of temperature sensors disposed between the main panel and the top plate.

DETAILED DESCRIPTION OF THE INVENTION

Figure 1:
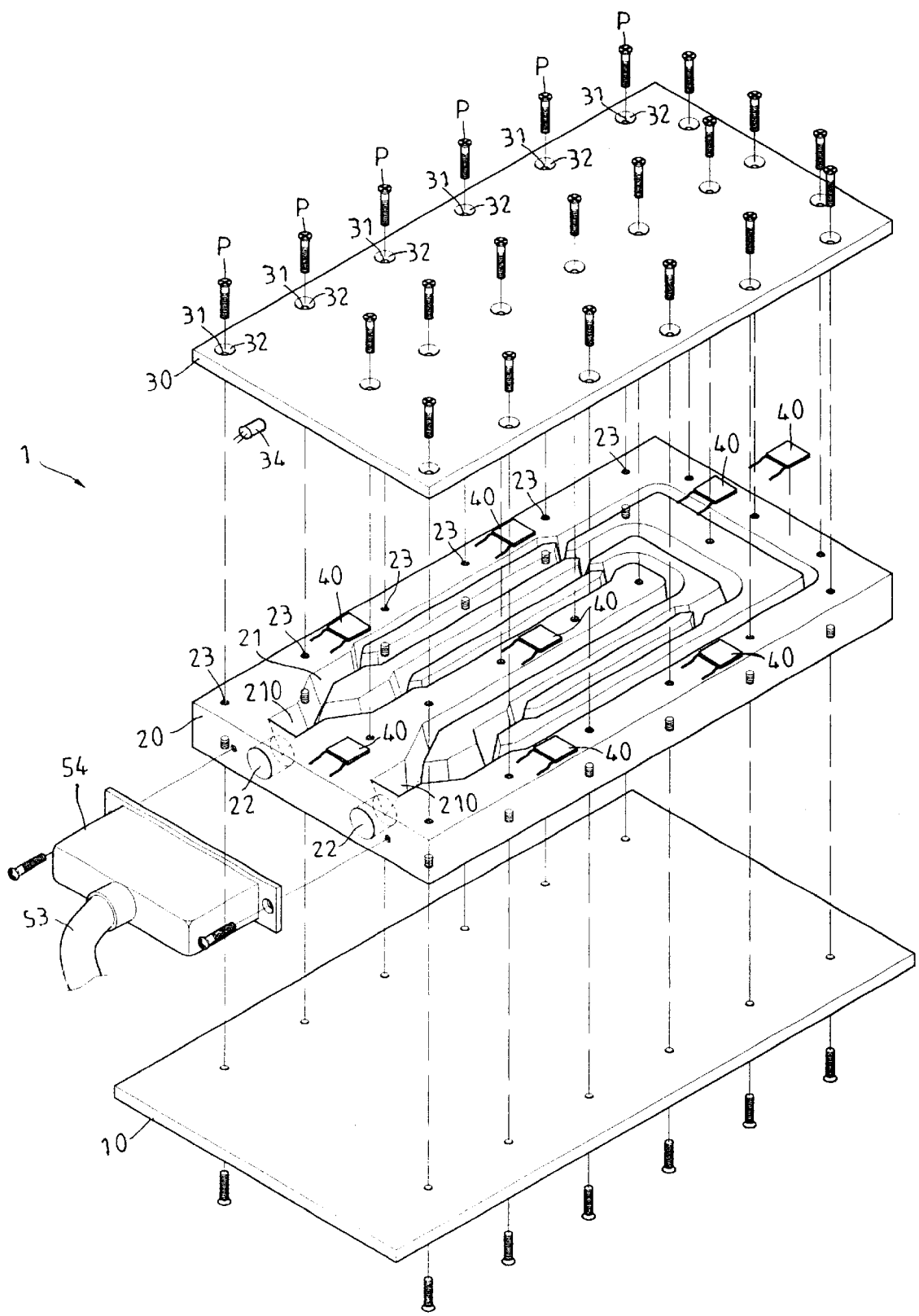
FIG. 1 is a perspective exploded view of a freezing sucker of a preferred embodiment in accordance with the present invention.
Figure 2:
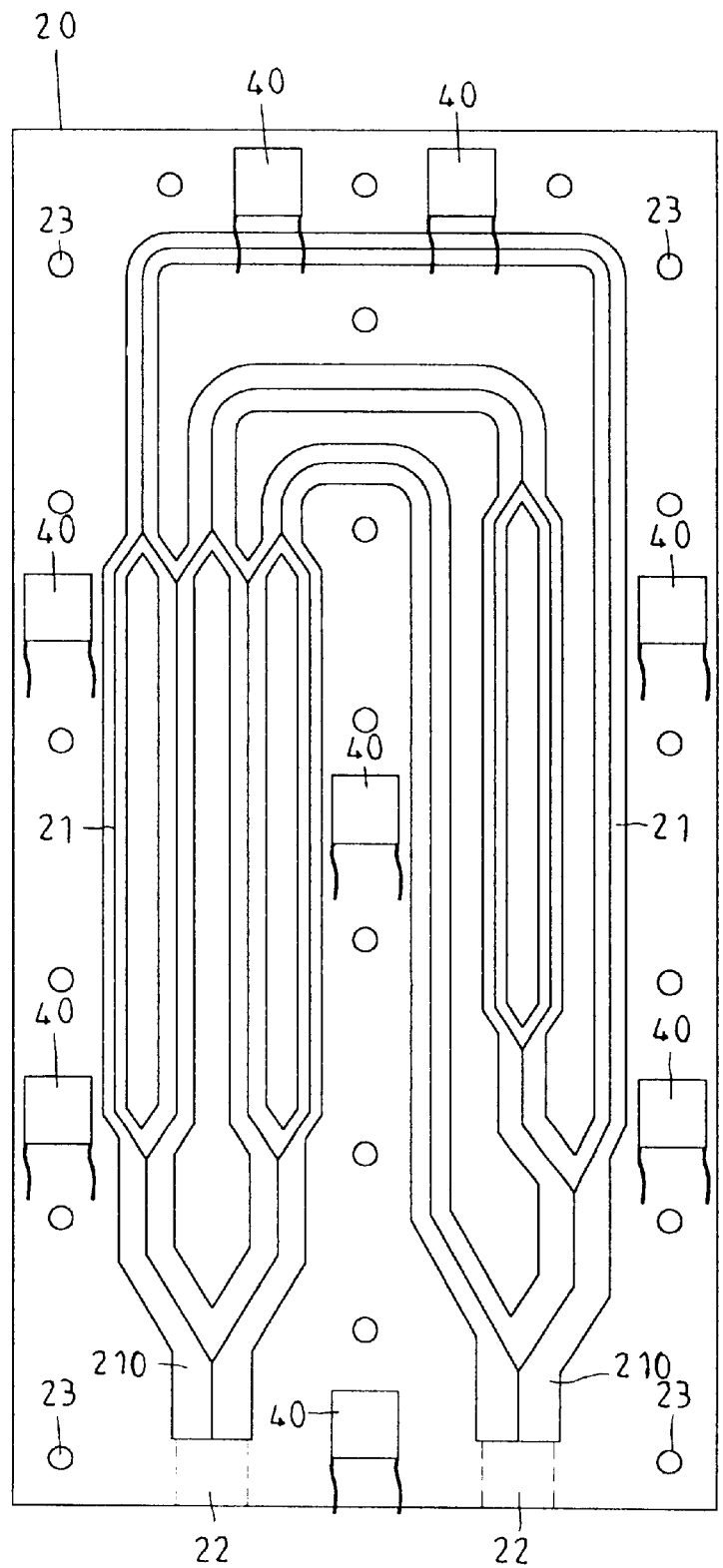
FIG. 2 is a top plan view of a main panel of a preferred embodiment in accordance with the present invention.
Figure 3:
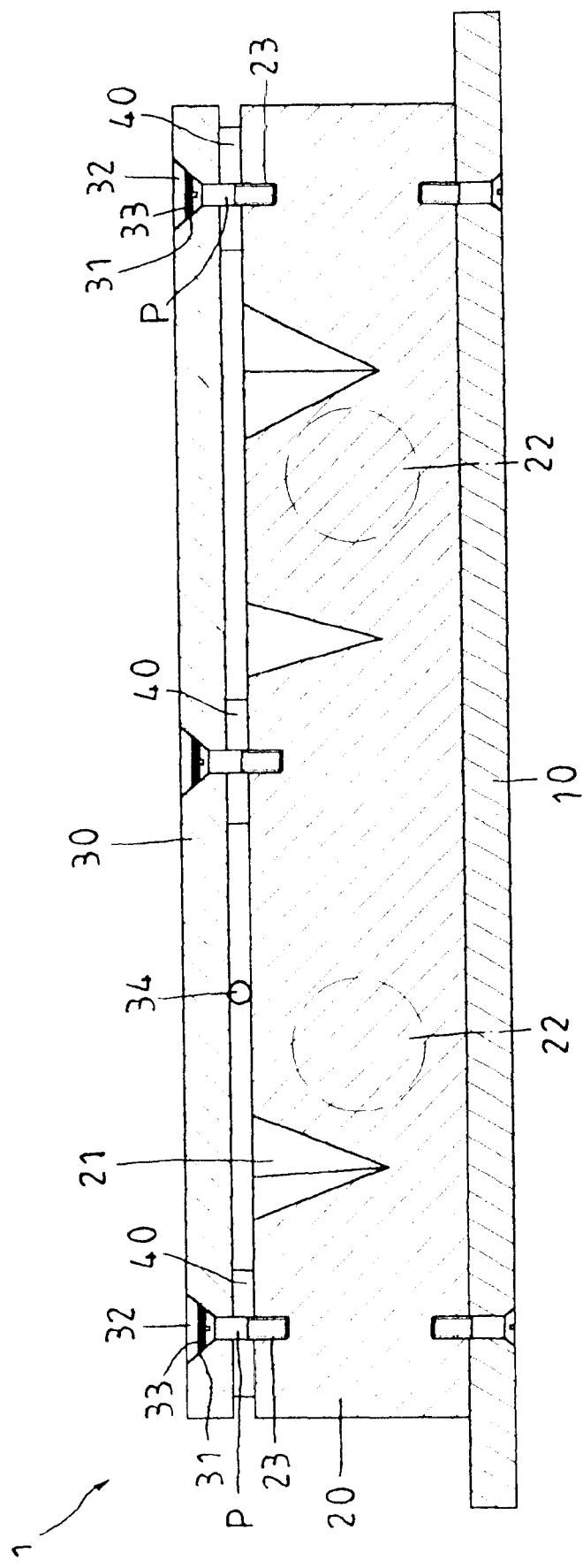
FIG. 3 is a sectional assembly view of a freezing sucker of a preferred embodiment in accordance with the present invention.

Referring to FIGS. 1 to 3 first, a freezing sucker 1 comprises a base plate 10, a main panel 20 disposed on the base plate 10, a plurality of chilling chips 40 disposed on the main panel 20, a top plate 30 disposed on the chilling chips 40, and a plurality of temperature sensors 34 disposed between the main panel 20 and the top plate 30.

The main panel 20 has a plurality of threaded recess apertures 23, a runner channel 21 having two outlets 210, and two lateral round holes 22 communicating with the outlets 210 of the runner channel 21.

The top plate 30 has a plurality of round apertures 31 and a plurality of grooves 32 communicating with the round apertures 31.

A plurality of screws P fasten the top plate 30 and the main panel 20 together through the round apertures 31 of the top plate 30 and the threaded recess apertures 23 of the main panel 20. A plurality of waterproof glues 33 are applied on the grooves 32 of the top plate 30.

Figure 4:
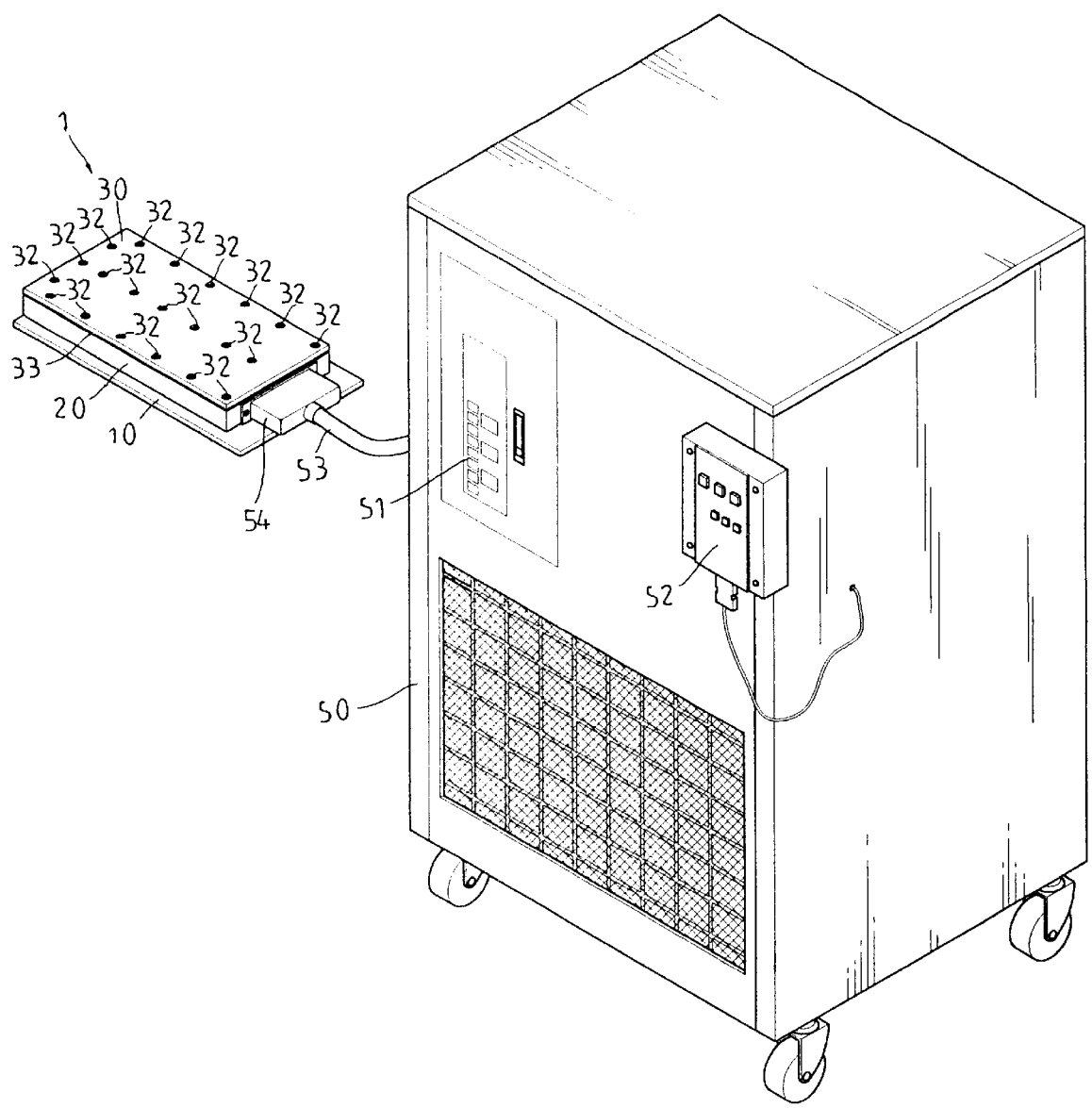
FIG. 4 is a perspective assembly view of a freezing sucker, a connector, a water pipe, and a freezing machine of a preferred embodiment in accordance with the present invention.

Referring to FIG. 4, a freezing machine 50 has a controller 52 and a control panel 51 to control and adjust the temperature of the freezing sucker 1. A connector 54 is connected to the main panel 20. A water pipe 53 is connected to the connector 54 and the freezing machine 50.

The chilling chips 40 freezes the top plate 30. The freezing machine 50 produces ice water into the water pipe 53 and the runner channel 21 of the main panel 20 in order to exchange heat with the chilling chips 40.

The temperature of the top plate 30 is detected by the temperature sensors 34.

Figure 5:
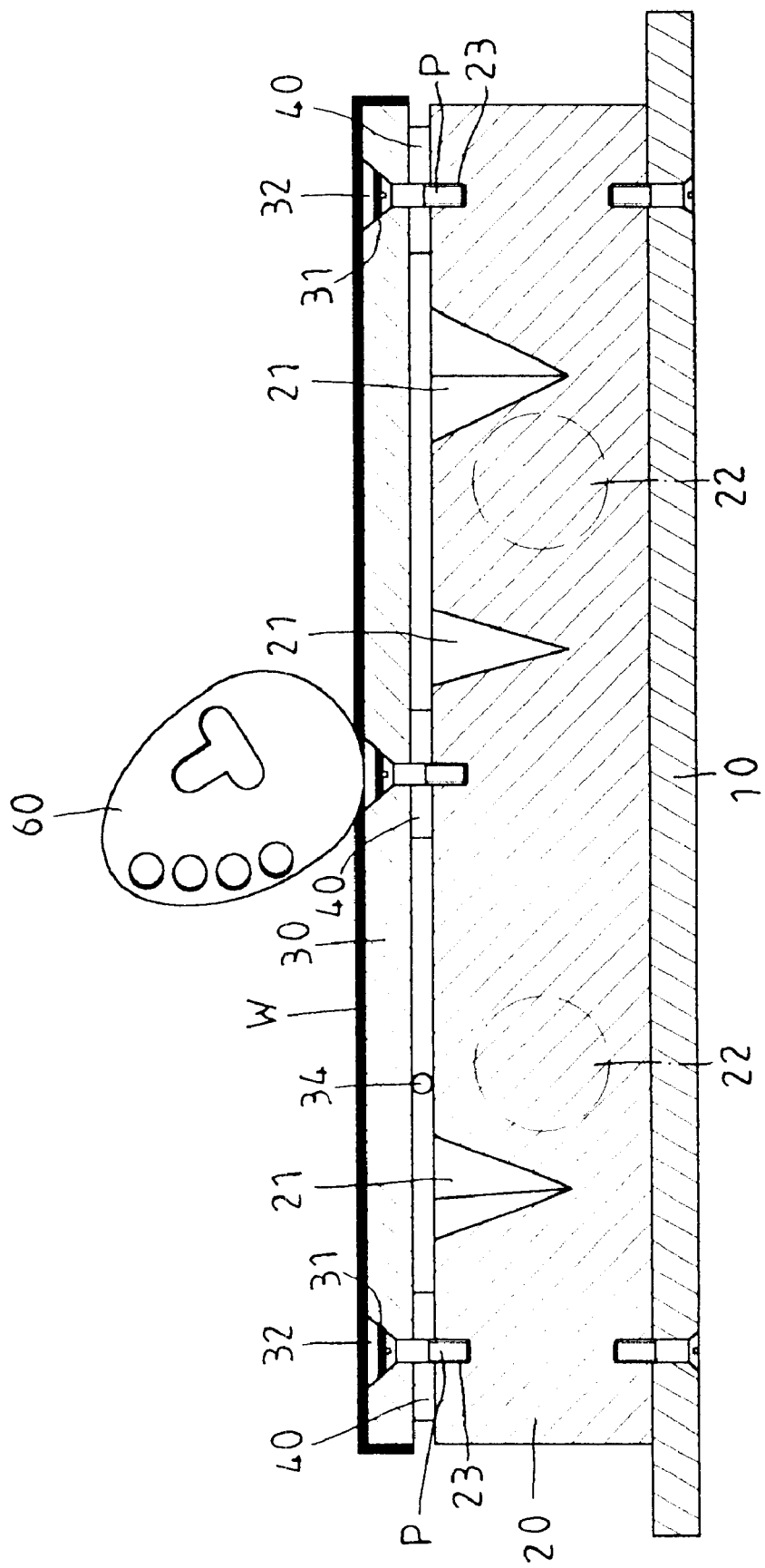
FIG. 5 is a sectional schematic view illustrating an application of a freezing sucker of a preferred embodiment in accordance with the present invention.

Referring to FIG. 5, a liquid W is disposed on the top plate 30. A working article 60 is disposed on the liquid W. The chilling chips 40 freezes the liquid W to approximately 230K or 240K. Therefore, the top plate 30 holds the working article 60 stably.

The present invention is not limited to the above embodiment but various modification thereof may be made. Furthermore, various changes in form and detail may be made without departing from the scope of the present invention.

I claim:

1. A freezing sucker comprises:
   a base plate,
   a main panel disposed on the base plate,
   a plurality of chilling chips disposed on the main panel,
   a top plate disposed on the chilling chips, and
   a plurality of temperature sensors disposed between the main panel and the top plate.

2. The freezing sucker as claimed in claim 1, wherein the main panel has a plurality of threaded recess apertures, a runner channel having two outlets, and two lateral round holes communicating with the outlets of the runner channel.

3. The freezing sucker as claimed in claim 2, wherein the top plate has a plurality of round apertures and a plurality of grooves communicating with the round apertures.

4. The freezing sucker as claimed in claim 3, wherein a plurality of screws fasten the top plate and the main panel together through the round apertures of the top plate and the threaded recess apertures of the main panel.

5. The freezing sucker as claimed in claim 4, wherein a plurality of waterproof glues are applied on the grooves of the top plate.

6. The freezing sucker as claimed in claim 1, wherein a freezing machine has a controller and a control panel, a connector is connected to the main panel, and a water pipe is connected to the connector and the freezing machine.

* * * * *